US011720352B2

(12) United States Patent
Bains et al.

(10) Patent No.: US 11,720,352 B2
(45) Date of Patent: Aug. 8, 2023

(54) FLEXIBLE COMMAND POINTERS TO MICROCODE OPERATIONS

(71) Applicant: Micron Technology, Inc., Boise, ID (US)

(72) Inventors: Manjinder Singh Bains, Yuba City, CA (US); Rucha Deepak Geedh, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 200 days.

(21) Appl. No.: 16/708,971

(22) Filed: Dec. 10, 2019

(65) Prior Publication Data

US 2021/0173644 A1    Jun. 10, 2021

(51) Int. Cl.
  *G06F 9/24*    (2006.01)
  *G06F 9/22*    (2006.01)
  *G06F 9/30*    (2018.01)
  *G06F 3/06*    (2006.01)

(52) U.S. Cl.
  CPC .............. *G06F 9/24* (2013.01); *G06F 3/0604* (2013.01); *G06F 3/0659* (2013.01); *G06F 3/0679* (2013.01); *G06F 9/223* (2013.01); *G06F 9/30076* (2013.01)

(58) Field of Classification Search
  CPC ........ G06F 9/24; G06F 3/0679; G06F 3/0659; G06F 3/0604; G06F 9/223; G06F 9/30076; G06F 15/7821; G06F 3/06
  See application file for complete search history.

(56) References Cited

U.S. PATENT DOCUMENTS

| | | | |
|---|---|---|---|
| 6,301,655 B1 * | 10/2001 | Manohar | G06F 9/30076 712/E9.032 |
| 6,343,353 B1 | 1/2002 | Kim | |
| 7,600,062 B2 * | 10/2009 | Su | G06F 8/65 710/72 |
| 8,737,138 B2 | 5/2014 | Pio | |
| 9,343,116 B2 | 5/2016 | Mirichigni et al. | |
| 9,740,485 B2 | 8/2017 | Mirichigni et al. | |
| 9,754,648 B2 | 9/2017 | Mirichigni et al. | |
| 10,242,731 B2 | 3/2019 | Hyun et al. | |
| 10,468,092 B2 | 11/2019 | Hyun et al. | |
| 2004/0025087 A1 | 2/2004 | Chi | |
| 2009/0024842 A1 | 1/2009 | Clark et al. | |
| 2014/0269067 A1 | 9/2014 | D'abreu et al. | |
| 2015/0220344 A1 * | 8/2015 | Siciliani | G06F 9/328 712/205 |
| 2016/0163373 A1 | 6/2016 | Hyun et al. | |
| 2017/0139836 A1 * | 5/2017 | Dittmann | G06F 15/7821 |

(Continued)

OTHER PUBLICATIONS

International Search Report and Written Opinion, PCT/US2020/062979, dated Mar. 9, 2021.

*Primary Examiner* — Charles Rones
*Assistant Examiner* — Tong B. Vo
(74) *Attorney, Agent, or Firm* — Greenberg Traurig

(57) ABSTRACT

Disclosed are apparatuses, methods, and computer-readable media for providing flexible command pointers to microcodes in a memory device. In one embodiment, a method is disclosed comprising receiving a command to access a memory device; accessing a configuration parameter; identifying a program counter value based on the configuration parameter and the command; and loading and executing a microcode based on the program counter.

17 Claims, 5 Drawing Sheets

(56) References Cited

U.S. PATENT DOCUMENTS

| | | |
|---|---|---|
| 2019/0087187 A1* | 3/2019 | Gschwind ............. G06F 9/3017 |
| 2019/0138226 A1* | 5/2019 | Kanno ................... G06F 12/16 |
| 2019/0179573 A1* | 6/2019 | Hsu ....................... G11C 11/005 |
| 2019/0198087 A1 | 6/2019 | Hyun et al. |
| 2020/0210196 A1* | 7/2020 | Ghetie ................... G06F 9/268 |
| 2021/0166764 A1* | 6/2021 | Hong ................. G11C 11/5628 |

* cited by examiner

FLEXIBLE COMMAND POINTERS TO MICROCODE OPERATIONS

COPYRIGHT NOTICE

A portion of the disclosure of this patent document contains material which is subject to copyright protection. The copyright owner has no objection to the facsimile reproduction by anyone of the patent document and the patent disclosure, as it appears in the Patent and Trademark Office patent files or records, but otherwise reserves all copyright rights whatsoever.

BACKGROUND

The disclosed embodiments are directed toward memory devices and, in particular, to devices, systems, methods, and computer-readable media for improving the efficiency of microcode operations in such memory devices.

Currently, memory devices such as non-volatile memory (NVM) devices utilize stored microcode for executing operations such as read and write operations. In general, a memory device provides an external interface that responds to such commands. These commands are then mapped to stored routines (microcodes) that manipulate the underlying storage fabric (e.g., read/writing to rows/columns of an NVM storage fabric). In essence, these devices provide an abstract layer (e.g., READ or WRITE) over more complex and lower-level operations performed using the memory circuitry (e.g., row/column enable, etc.). Further, in some memory devices these microcodes are stored using polyfuses or similar devices. Such devices occupy significant amounts of die space.

These memory devices however suffer from various technical limitations. Principally, such devices are limited to only one microcode routine per command. Thus, as one example, the same microcode routine is executed for every READ command issued to the memory device. Such an approach fails to optimize the performance of the memory device based on the conditions surrounding the received command (e.g., receiving a command pre- or post-cycling). The disclosed embodiments solve this and other problems.

DETAILED DESCRIPTION

The disclosed embodiments describe systems, devices, methods, and computer-readable media for providing flexible command pointer that enable the dynamic toggling of microcode algorithms for the same memory access commands. In one embodiment, a plurality of microcodes are stored in a memory and either a parameter-based or cycle count-based switching mechanism is used to toggle from a default microcode to an alternative microcode. Further, jump instructions allow the alternative microcodes to return to the default microcode, thus reducing code duplication. The disclosed embodiments may be implemented as user-controlled, automatically control, or may allow post-production processes to permanently select one microcode or another before final testing.

Figure 1:
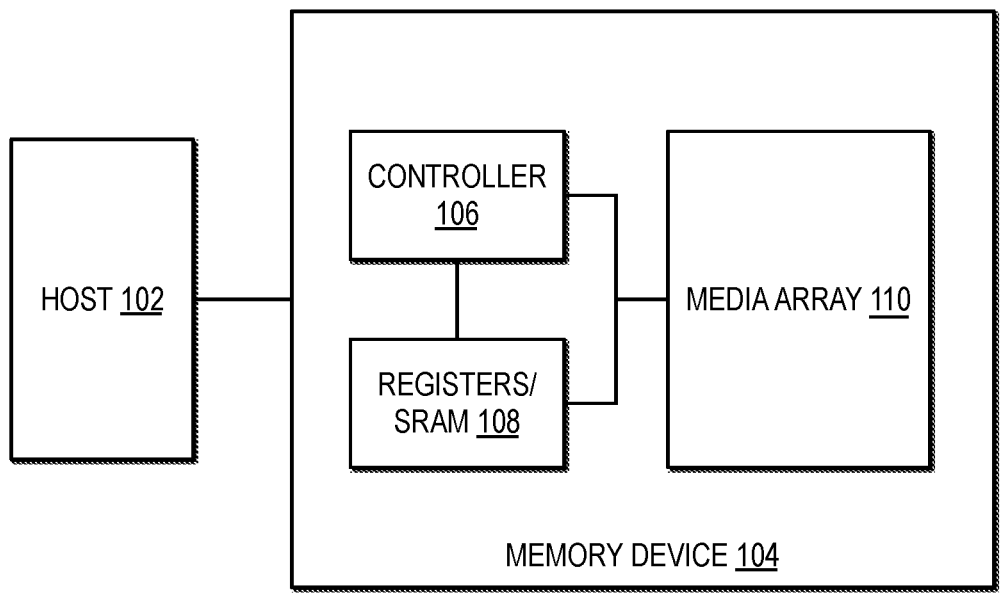
FIG. 1 is a block diagram of a memory device according to some embodiments of the disclosure.

FIG. 1 is a block diagram of a memory system according to some embodiments of the disclosure.

In the illustrated embodiment, a host (102) is communicatively coupled to a memory device or apparatus (104). In the illustrated embodiment, the host (102) can comprise any computing device capable of issuing commands to the memory device (104). In one embodiment, the host (102) and memory device (104) are connected via a data bus or other interface. As one example, host (102) and memory device (104) can be connected via a PCIe or NVMe bus/interface. In general, host (102) will issue commands to read and write data from/to memory device (104). In brief, a read command indicates a memory address to read data from. The memory address may comprise a logical or physical address memory address. For example, if the memory device (104) provides access to a NAND Flash array, the read command may include a logical block address (LBA). A write command indicates a memory address to write to and a data payload to write to that memory address. In some embodiments, both commands may also include one or more trim parameters used to modify the operation of the commands. Examples of trim parameters include a program rate, voltage level, step-up voltage/size, program pulse width, and other parameters. In some embodiments, the trim parameters may also include a flag indicating a variant of microcode code to use (as described in more detail herein).

In the illustrated embodiment, the memory device (104) includes a controller (106), which is also referred to as a processor, registers/static random-access memory (SRAM) (108), and a media array (110).

Figure 2:
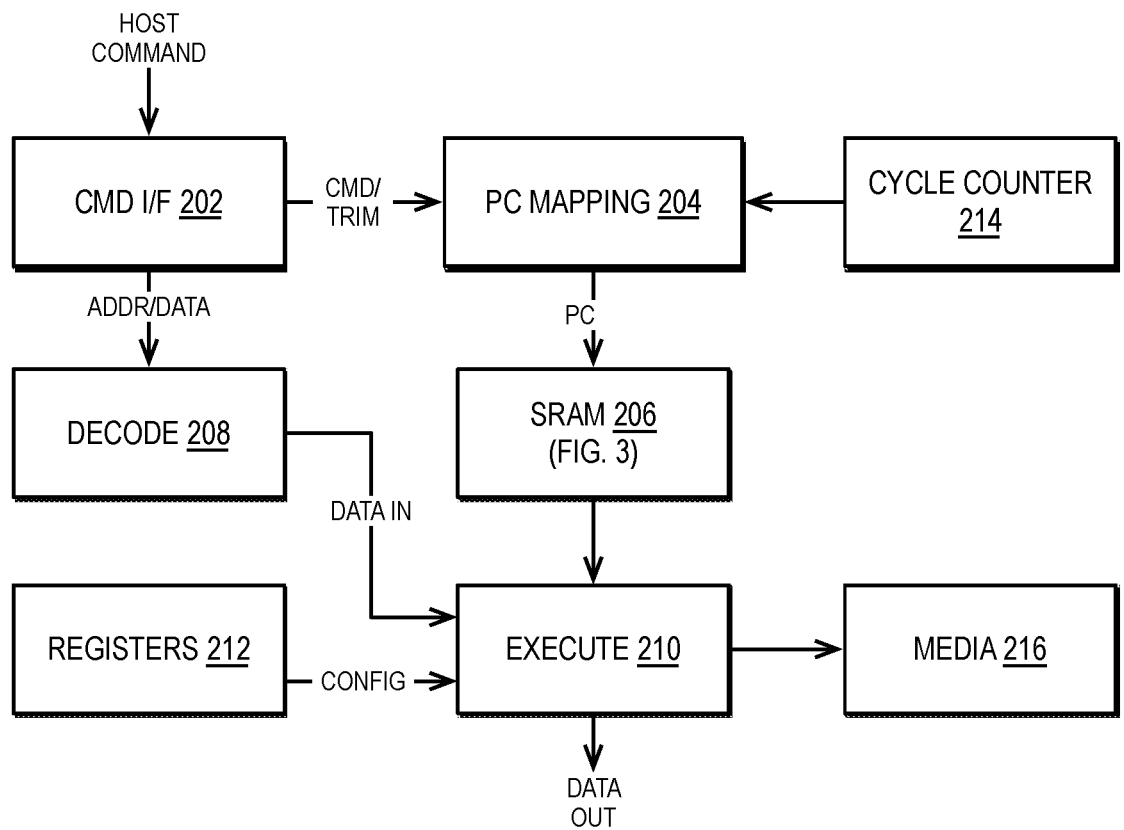
FIG. 2 is a block diagram illustrating a controller and memory according to some embodiments of the disclosure.

Logical elements of the controller (106) and registers/SRAM (108) are described in more detail in FIG. 2, the description of which is not repeated herein. In brief, the controller (106) contains the logic for accessing media array (110). In the illustrated embodiment, firmware (also referred to as microcodes) as stored in registers/SRAM (108). In response to receiving a command, the controller (106) identifies the appropriate firmware stored in registers/SRAM (108) and proceeds to load instructions associated with the firmware from registers/SRAM (108). The controller (106) is further configured to implement the microcode selection routines which are described in more detail herein. After loading instructions from registers/SRAM (108), the controller (106) executes the instruction which read, writes, or otherwise performs a computation involving the media array (110).

In the illustrated embodiment, the media array (110) can comprise a NAND Flash array or other type of non-volatile storage device. In some embodiments, the media array (110) can comprise a local storage medium or a network-attached storage medium or storage area network). In some embodiments, the media array (110) may comprise a volatile memory such as a dynamic random-access memory (DRAM) or static RAM (SRAM). The specific form of the memory (or contents thereof) are not intended to be limiting.

FIG. 2 is a block diagram illustrating a controller and memory according to some embodiments of the disclosure.

In the illustrated embodiment, a command interface (202) is configured to receive a command from (for example) a host device. The interface (202) may comprise a PCIe, NVMe, or similar command interface for receiving host commands and transmitting the commands and any trim parameters to program counter mapping logic (204). Specific processing of the command interface (202) of commands is not intended to be limiting. In general, the command interface (202) validates commands and performs any administration or maintenance tasks required for the underlying protocol. As illustrated, the interface (202) transmits a command including, for example, trim parameters included in the command to the mapping logic (204). Additionally, the interface (202) transmits the address included in the host command and any data (e.g., for write commands to the decode logic (208).

In the illustrated embodiment, program counter mapping logic (204) is configured to receive a command and return a program counter identifying where in memory the corresponding algorithm is located. In some embodiments, program counter mapping logic (204) may be implemented as part of decode logic (208) but is illustrated as a separate logical block. The program counter mapping logic (204) includes a mapping of command types to program counters. This mapping may include one or more alternative mappings that are further mapped based on trim parameters or cycle counts. As illustrated, a cycle counter (214) is provided which monitors the number of program/erase cycles issued by the controller to the underlying storage fabric. In alternative embodiments, other cycles (read, write, etc.) may be monitored and counted. In one embodiment, the cycle counter (214) comprises a counter and a comparator that compares the count to a hard-wired cycle count. Once the counter exceeds that count, the cycle counter (214) signals the program counter mapping logic (204) to change mappings. As described above, the program counter mapping logic (204) may include two or more program counter values for single command (e.g., READ). The program counter mapping logic (204) may be configured with a default program counter value for a given command (e.g., PC_1). In response to an explicit trim value indicating an alternative program counter value, the program counter mapping logic (204) may alternatively return a different program counter value for a given command (e.g., PC_2). Additionally, if the cycle counter (214) signals to use an alternative command, the program counter mapping logic (204) may automatically use the alternative program counter. In some embodiments, the signaling of the cycle counter (214) may override user-specific trims, or vice-a-versa.

Figure 3:
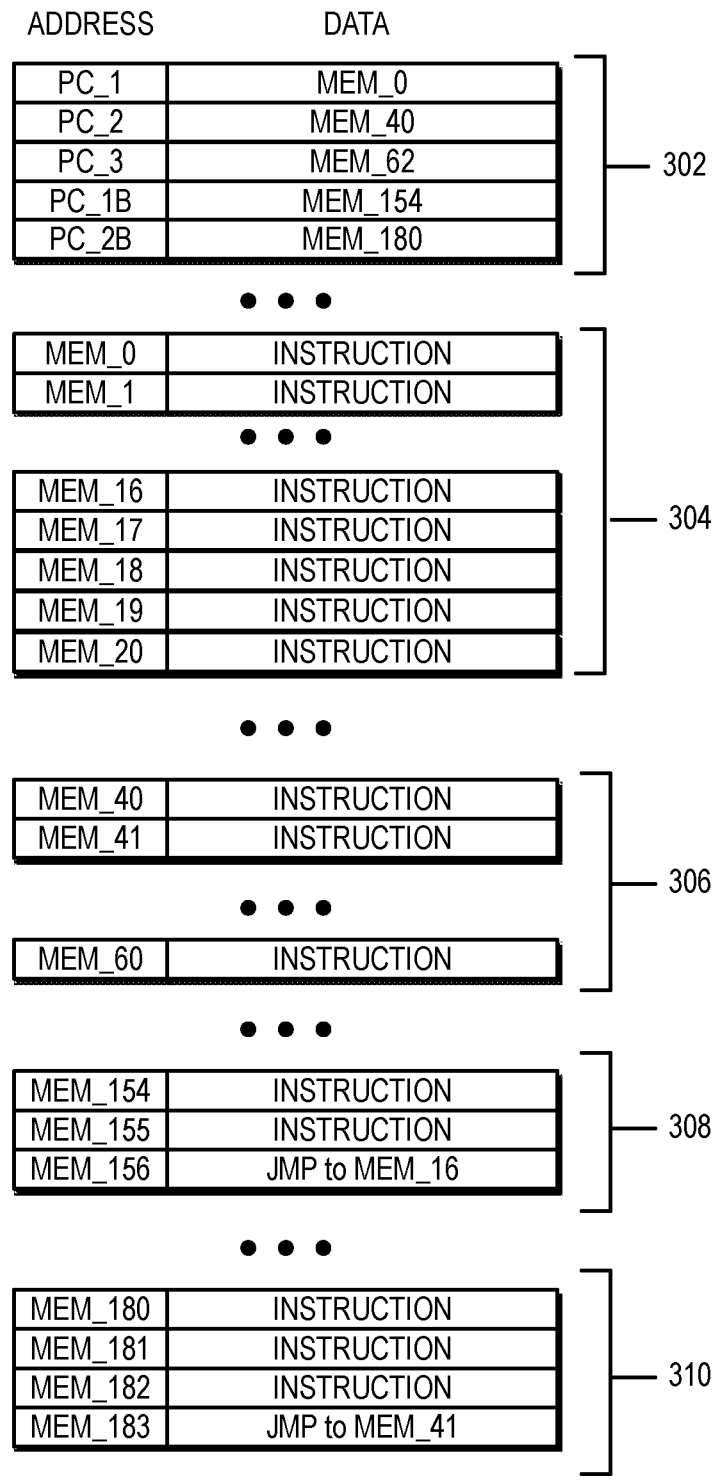
FIG. 3 is a memory diagram illustrating an exemplary memory layout according to some embodiments of the disclosure.

The program counter is used to access an instruction from SRAM (206). A layout of SRAM (206) is depicted in FIG. 3. In some embodiments, as described above, the program counter mapping logic (204) may be implemented as part of decode logic (208) and thus decode logic (208) may access memory using the identified program counter similar to other computer architectures. As illustrated, in response to the identified program counter, the SRAM (206) returns the instructions to execution unit (210). In some embodiments, the instruction may comprise a location in memory or an instruction to execute. In some scenarios, the instruction to execute includes a jump (JMP) instruction. In response to a jump, the execution unit (210) will retrieve the identified instruction at the location in SRAM (206) identified in the jump. In addition to the foregoing, decode logic (208) decodes the address and data received from the command interface (202) and transmits the data received to the execution unit (210). The instructions stored in SRAM (206) are then executed using the input data decoded from the host command.

In the illustrated embodiment, the execution unit (210) may comprise an arithmetic logic unit (ALU) or other type of processing logic. The specific details of the execution unit (210) are not intended to be limiting. The execution unit (210) performs the operation using the input data and microcode from SRAM (206) and returns an output data value. In the illustrated embodiment, the execution unit (210) additionally loads any configuration data from registers (212) to adjust the execution of microcode by execution unit (210). Additionally, the execution unit (210) may write data to media (216) for future use by other instructions. Details of the execution phase of the controller may be implemented similar to existing controllers and further detail is not included herein.

FIG. 3 is a memory diagram illustrating an exemplary memory layout according to some embodiments of the disclosure.

In the illustrated embodiment, the memory sections (302-310) illustrated may be implemented in a single memory. This single memory may comprise a ROM or a volatile memory such as an SRAM, DRAM, or Flash storage. In some embodiments, different sections may be stored in heterogeneous memory types. For example, one section (302) may be stored in ROM while the remaining sections (304-310) may be stored in SRAM, and vice-a-versa. In the following descriptions sections (304-310) are alternatively referred to as microcodes. Further, as illustrated, each entry in the memory includes an address and data. The specific number of address bits and data word lengths are not intended to be limiting.

As illustrated, a first section of memory (302) includes a mapping of program counter addresses to memory locations. Specifically, three program counters (PC_1, PC_2, PC_3) are mapped to three memory locations (MEM_0, MEM_40, MEM_62). These three memory locations refer to starting instructions of microcode routines. Two matching routines for locations MEM_0 and MEM_40 are illustrated as sections (304, 306). Generally, when a controller loads PC_1 or PC_2, the controller will identify the mapping memory address and load the next instruction at the mapped memory locations (MEM_0 and MEM_40, respectively).

In an alternative embodiment, the first section of memory (302) can be offset from a first memory location by a preset amount. That is, the first section of memory (302) may be read after one or more initial memory locations. During operation, the loading of pointer values for program counters can introduce additional clock cycles required for a given command and thus can degrade the latency of operations. To remedy this potential issue, the program counter mapping can be located after one or memory locations to execute. For example, a READ operation can begin execution at MEM_0 while the program counter mapping is stored in MEM_1. While the instructions in MEM_0 are executed, the program counter mapping can be read simultaneously. Then, when executing the next instruction (MEM_1), the control jumps to the program counter value associated with the appropriate microcode (as described in more detail herein).

The first section of memory (302) additionally includes two alternative program counter values (PC_1B, PC_2B). These two program counters correspond to alternative implementations of the microcode stored in sections (304, 306). Specifically, PC_1B is mapped to the microcode beginning at MEM_154 and depicted as section (308) and PC_2B is mapped to the microcode beginning at MEM_180 and depicted as section (310). Thus, when a controller loads PC_1B or PC_2B, the respective alternative microcodes (308, 310) are executed. As described previously, and in more detail in the descriptions of FIGS. 4 through 6, the loading of alternative microcodes may be performed via setting of trim parameters or based on cycle counting.

As illustrated in FIG. 3, microcodes (308, 310) may comprise partial algorithms. For example, microcode (308) includes two instructions at MEM_154 and MEM_155 followed by a jump instruction (JMP) to MEM_16, which is an intermediate instruction of microcode (304). Thus, in the illustrated embodiment, the microcode (308) effectively replaces MEM_0 through MEM_15 of microcode (304) with two instructions at MEM_154 and MEM_155 and begins executing microcode (304) at an intermediate point of the algorithm. In some embodiments, microcodes (such as full microcodes 304, 306) includes various setup instructions that set voltages and other parameters of the underlying memory storage medium. Based on certain conditions, optimizing these parameters based on the state of the device improves performance. Thus, as one example, microcodes (304, 308) may both be associated with a READ operation. In this example, microcode (308) may adjust operating voltages of the underlying memory fabric based on, for example, whether the memory is used as data storage or as a buffer (or based on the number of program/erase cycles). However, the actual operations of reading data from the memory fabric are the same for both microcodes (304, 308). Thus, instead of storing a duplicate of microcode (304), the memory layout instead stores alternative configuration instructions followed by a jump to the remainder of the first algorithm in microcode (304). A similar arrangement (for, as one example, alternative WRITE command operations) is shown with respect to microcodes (306, 310) and the above description is equally applicable to these microcodes (306, 310).

Finally, mapping section (302) includes a program counter (PC_3) that does not include an alternative program counter. In some embodiments, only specific algorithms may require alternative implementations. Thus, the mapping section (302) equally includes single mappings between program counters and microcodes.

The above-described memory layout provides numerous advantages over other technical solutions. In some devices, new instructions are provided to support alternative microcodes. Thus, an instruction set may include a READ command as well as a (hypothetical) READ_POST_CYCLE command to execute an alternative microcode. Such a solution requires significant changes to the underlying device (i.e., by requiring a completely new instruction set) and further requires changes to the decoding circuitry of the controller. A second alternative, briefly mentioned above, relies on fully duplicating the microcode and tweaking parameters as needed for alternative microcode. This approach does not require significant decoding changes; however, it doubles the firmware storage device which increases costs of manufacturing the device. Furthermore, the doubling of firmware memory increases the size of the underlying die which inherently reduces the effectiveness of the circuitry due to the reduction in die space. The above memory architecture (and methods described herein) solve these problems.

Figure 4:
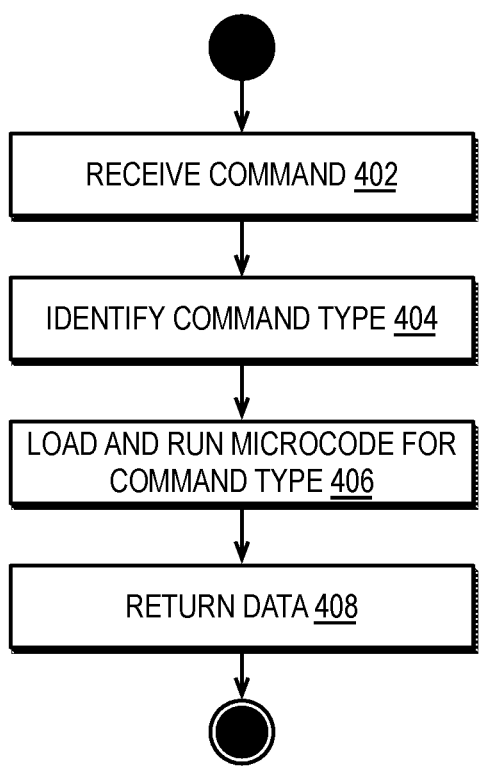
FIG. 4 is a flow diagram illustrating a method for executing microcode according to some embodiments of the disclosure.

FIG. 4 is a flow diagram illustrating a method for executing microcode according to some embodiments of the disclosure.

In block 402, the method receives a command. In some embodiments, the command comprises a command related to a memory device. Examples of such commands include read and write commands, although other commands accessing an underlying memory structure fall within the scope of the disclosure. A command received in block 402 includes a command name or identifier (e.g., READ, WRITE, etc.). Many commands such as read or write commands include a memory address. Additionally, commands like write (or program) include a data payload. In addition to these fields (and others), each command can include one or more flags or configuration parameters that control the operation of the command. Some of these parameters can comprise trim parameters which modify, as one example, analog aspects of the underlying memory device (e.g., step voltages, etc.). One of these trim parameters may include a flag indicating an alternative microcode should be used (as will be discussed).

In block 404, the method identifies a command type. In one embodiment, the method maintains a mapping of commands (e.g., READ, WRITE, etc.) to a list of program counter values. Thus, in block 404, the method identifies the command (or binary representation of the command name) and loads the program counter value associated with the command at a microcontroller.

In block 406, the method loads and runs the microcode for a given command type. As described above, each microcode is associated with a starting address in memory. In block 406, the method uses the identified program counter to load the first instruction at that address and proceeds to sequentially execute the microcode by sequentially stepping through the memory locations and executing the instructions (including program control instructions such as jump and return instructions).

In block 408, the method returns the result of the microcode operation. In the illustrated embodiment, the return value in block 408 comprises a final value returned by the microcode instructions. In the illustrated embodiment, the ultimate result return by the microcode may comprise the result of accessing the memory structure. For example, for a READ command the ultimate result comprises the value stored in memory while for a WRITE command the ultimate value may comprise a status indicator. In some embodiments, the method may raise a BUSY signal while the method is executing the microcode and lower the BUSY signal when processing is complete. This signal can be latched to the output of an execution unit and thus trigger the output of data from the method. In some embodiments, block 408 is optional. For example, for a WRITE command, the method may not return any value.

In the illustrated embodiment, only one microcode per instruction is executed. The following embodiments provide alternatives wherein multiple microcodes can be selectively chosen and executed in response to the same command received in block 402.

Figure 5:
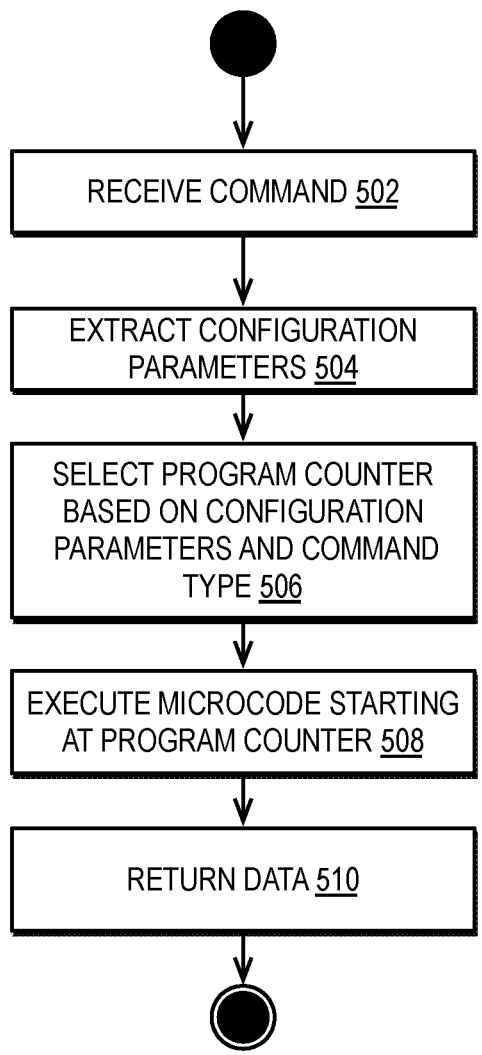
FIG. 5 is a flow diagram illustrating a method for executing alternative microcode for a host command according to some embodiments of the disclosure.

FIG. 5 is a flow diagram illustrating a method for executing alternative microcode for a host command according to some embodiments of the disclosure.

In block 502, the method receives a command. In some embodiments, the command comprises a command related to a memory device. Examples of such commands include read and write commands, although other commands accessing an underlying memory structure fall within the scope of the disclosure. A command received in block 402 includes a command name or identifier (e.g., READ, WRITE, etc.). Many commands such as read or write commands include a memory address. Additionally, commands like write (or program) include a data payload. In addition to these fields (and others), each command can include one or more flags or parameters that control the operation of the command. Some of these parameters can comprise trim parameters which modify, as one example, analog aspects of the underlying memory device (e.g., step voltages, etc.). One of these trim parameters may include a flag indicating an alternative microcode should be used (as will be discussed).

In block 504, the method extracts any configuration parameters from the command. As described above, these configuration parameters may indicate that alternative microcode should be used. As described in connection with the foregoing Figures, each command may have a "default" microcode and one or more alternative microcodes.

In one embodiment, a trim parameter is included with a command that identifies one of these alternative microcodes. In one embodiment, the trim parameter can comprise a bit string identifying an alternative number (e.g., 0x01, 0x02, etc.). Alternatively, the trim parameter can identify the program counter value itself. In this embodiment, the method may first verify that the received program counter value in the trim parameter is a valid address and is also associated with one or more of the alternative microcode starting addresses.

In some embodiments, the configuration parameters may comprise other values. For example, a configuration parameter can comprise a setting describing the efficiency of the operation (i.e., fast, non-critical, etc.). This configuration value can then be used to map to microcodes. In some embodiments, the configuration parameters can include a cascading set of parameters wherein a first, second, and third microcode are executed in order.

In block 506, the method selects a program counter value based on the configuration parameters extracted from the command and the type of command. In one embodiment, the method maintains a table mapping commands and configuration parameters to program counter addresses. Thus, if the method receives a READ command and trim parameter of 0x02, the method can select a microcode matching this combination, which is distinct value as compared to the mapping between READ and a trim parameter 0x01.

In the embodiment, where the configuration parameter describes a setting describing the efficiency of the operation, the mapping can be simplified. For example, a configuration parameter can comprise an enumerated type of NONE, PRE-CYCLE, or POST-CYCLE. Selected commands can be provided with corresponding microcodes for these states. Thus, when a command is received indicating PRE-CYCLE, the pre-cycle microcode can automatically be loaded via a first program counter. In this manner, the details on how mappings between configuration parameters and microcodes can be hidden from the end user.

In the embodiment where the configuration parameter is a cascading set of parameters, the method may select a program counter for the first identified microcode (which can be identified in the manners described above). At the end of the first identified microcode, the method may intercept the program counter and load the program counter associated with the second-identified microcode. Additionally, the method may intercept any jump commands to load the second-identified microcode. This process may continue for all configuration parameters.

In block 508, the method loads and runs (i.e., executes) the microcode starting at the identified program counter address. Execution of microcode at a given program counter value is described in the description of block 408 and that description is incorporated herein. As described above, in some embodiments, the method (500) may alternatively execute one or more shared microcode instructions prior to jumping to a program counter associated with the configuration parameters and command type.

In block 510, the method returns the result of the microcode operation. In the illustrated embodiment, the return value in block 510 comprises a final value returned by the microcode instructions. This block may be performed similar or identically to that described in the description of block 408, the description of which is incorporated herein. Notably, in some embodiments, the resulting output of block 510 will be identical to that returned in block 408. In this manner, a downstream device (e.g., host 102) receives the same return value regardless of whether the method in FIG. 4 is utilized or the method in FIG. 5 is utilized, thus providing improved operational performance without requiring modification of downstream code or applications.

In contrast to traditional microcode, the microcodes used in the disclosed embodiments include jump statements to other microcode routines, as depicted in FIG. 3. In traditional firmware, microcode routines are free to jump within a given routine (i.e., to perform a branch or loop within the algorithm). In addition to this type of jump command, the disclosed embodiments describe the use of an inter-microcode jump whereby microcode can be started at arbitrary memory addresses within a routine. Thus, when loading and running a first microcode in block 508, the method can jump to an intermediate (or first) instruction of a separate microcode routine. In this manner, the method can implement compositional functionality whereby a "second" microcode routine includes a minimal set of header instructions (i.e., configuring trim settings) while offloading the bulk of the operations to a shared set of instructions implemented in the "default" microcode.

In some embodiments, the default microcode can also be configured to conditionally branch back into the alternative microcode. In this embodiment, the alternative microcode can be configured a pre-defined register to contain data describing the return jump. Then, when jumping to the default microcode, the default microcode can access that register value to determine whether to jump back to an address in the alternative microcode. One usage example of this type of return jump is for implementing "clean up" instructions in the alternative microcode. Thus, the default microcode is configured with instructions to determine if a return to the alternative microcode is needed. If so, the default microcode will cede control back to the alternative microcode at a pre-determined instruction in the default microcode.

Figure 6:
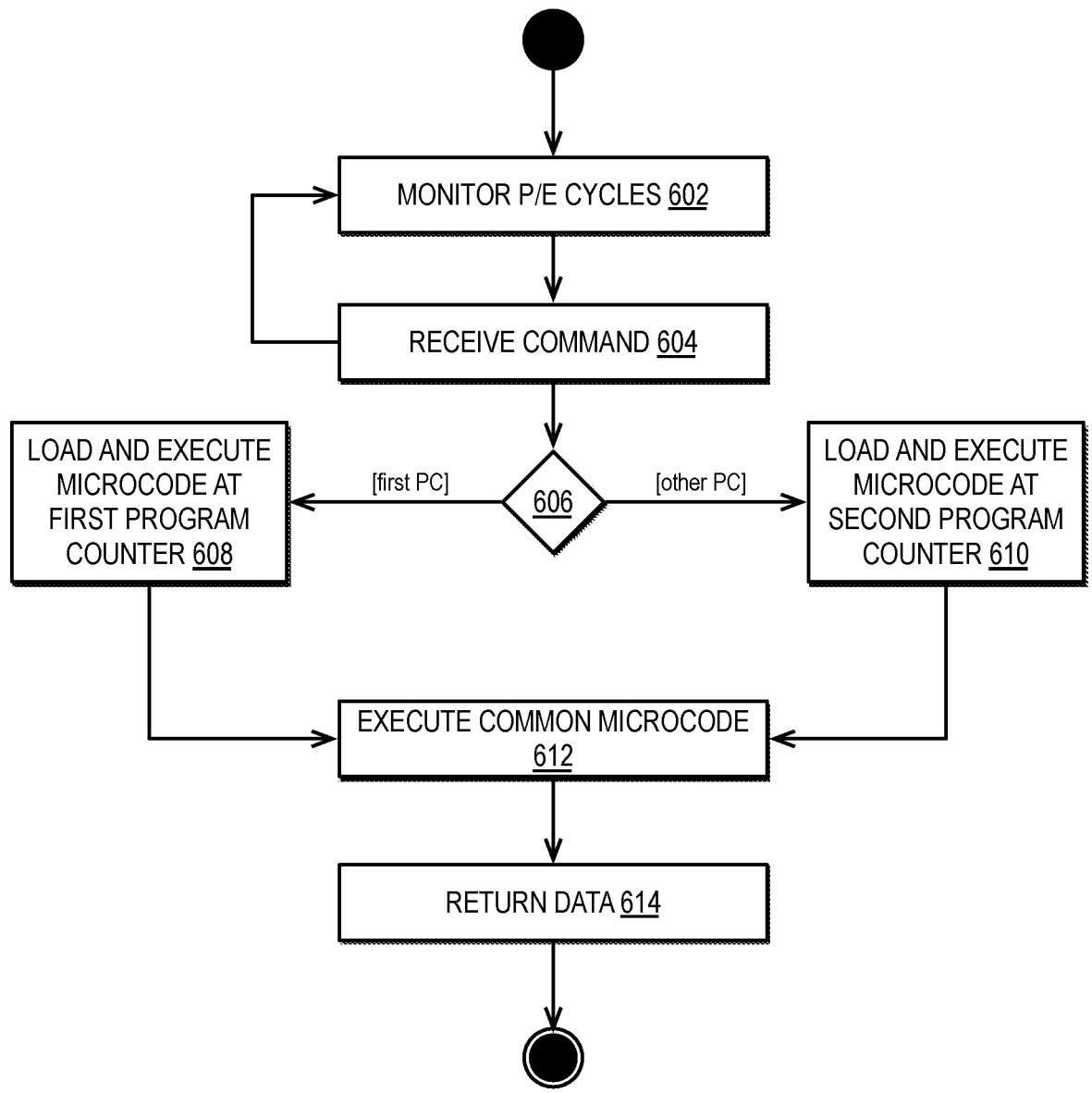
FIG. 6 is a flow diagram illustrating a method for executing alternative microcode based on a cycle count according to some embodiments of the disclosure.

FIG. 6 is a flow diagram illustrating a method for executing alternative microcode based on a cycle count according to some embodiments of the disclosure.

In block 602, the method monitors the number of program/erase (P/E) cycles executed on the underlying storage medium. As used herein, a program/erase cycle refers to the number of time data is written, erased, and re-written to an underlying NAND Flash array. In the illustrated embodiment, the method maintains a state register that is incremented for each P/E cycle. This state register is copied to non-volatile memory on power off or reset thus enabling a running counter of P/E cycles. The illustrated embodiment utilizes P/E cycles, however other metrics may be used. For example, the method may be employed to monitor the number of reads, writes, or power on/off events. Further, while the illustrated method is described primarily with respect to NAND Flash memory devices, it may be employed in other non-Flash storage media as described above.

In block 604, the method receives a command. In some embodiments, the command comprises a command related to a memory device. Examples of such commands include read and write commands, although other commands accessing an underlying memory structure fall within the scope of the disclosure. A command received in block 402 includes a command name or identifier (e.g., READ, WRITE, etc.). Many commands such as read or write commands include a memory address. Additionally, commands like write (or program) include a data payload. In addition to these fields (and others), each command can include one or more flags or parameters that control the operation of the command. Some of these parameters can comprise trim parameters which modify, as one example, analog aspects of the underlying memory device (e.g., step voltages, etc.). One of these trim parameters may include a flag indicating an alternative microcode should be used (as described previously).

The blocks 602 and 604 may be executed repeatedly while a device is operating. In some embodiments, blocks 602 and 604 are additionally executed during operations.

In block 606, upon receiving a command the method selects a program counter value based on the command type and the number of P/E cycles. In some embodiments, the method compares the number of P/E cycles to a threshold that triggers a change in program counter for a given command type. In some embodiments, the threshold comprises a static value configured during fabrication of the device. As one example, the threshold may comprise a fixed number of P/E operations before the Flash cells begin to deteriorate. In this example, the method uses this fixed number as the threshold.

In block 608, if the method determines that a first program counter should be used (e.g., the number of P/E cycles has not exceeded a threshold), the method loads and executes the microcode that is located a first program counter value. As described above, each microcode is associated with a starting address in memory. In block 608, the method uses the identified program counter to load the first instruction at that address and proceeds to sequentially execute the microcode by sequentially stepping through the memory locations and executing the instructions (including program control instructions such as jump and return instructions). In one embodiment, the first program counter may refer to a default program counter value for the given command. Thus, in this embodiment, the method executes similar to that described in FIG. 4. Alternatively, the method may inspect configuration parameters to determine whether alternative microcode can be run. In this embodiment, the method executes similar to that described in FIG. 5

In block 610, the method loads and executes the microcode at the location identified by a second program counter when the method determines that the second program counter should be used (e.g., a number of P/E cycles has exceeded a threshold). This is performed similar to that described previously in the description of block 608. Continuing the previous example, if the number of P/E cycles exceeds a threshold, the second microcode may be designed to compensate for the degradation of the Flash cells. As one example, the reference voltage for reads may be increased to ensure more accurate reads. Additionally, a trailer may be added that signals to the host that the number of P/E cycles has exceeded the threshold (optionally indicating by how much) and can be included in return data.

In an optional embodiment, the method can update a program counter mapping. As described above, the program counter mapping is used to select the microcode to use in response to a command. In block 610, since the number of P/E indicates a change in program counter value, the method automatically "re-maps" the command to a second program counter value. In some embodiments this re-mapping is only executed once for a given command and breach of the threshold in block 606. That is, once the P/E threshold is breached, the method permanently changes the program counter mapping. Thus, processing proceeds directly to block 610 after receiving a command.

In block 612, the method loads and runs (i.e., executes) common microcode at shared program counter address. in the illustrated embodiment, the common microcode comprises a set of instructions shared by both microcode invocations. That is, in blocks 608 and 610 an initial preamble of microcode instructions is loaded and executed and after executing these different preambles, the microcodes converge into a single set of microcode instructions. In some embodiments, the common microcode may comprise instructions associated with the microcode initially executed from the first program counter in block 608. In these embodiments, after executing block 610, the method jumps to an intermediate location in the first microcode to "resume" the common microcode.

In some embodiments, the method illustrated in FIG. 6 may execute block 610 while also detecting a configuration parameter in the command received in block 604. In this scenario, the method may either honor the configuration parameter and load a third program counter address. Alternatively, the method may ignore the configuration parameter and simply always load the second program counter address.

In block 614, the method returns the result of the microcode operation. In the illustrated embodiment, the return value in block 614 comprises a final value returned by the microcode instructions. This block may be performed similar or identically to that described in the description of block 408, the description of which is incorporated herein.

Although the aforementioned embodiments have focused primarily on runtime changing of microcodes, the memory layout depicted in FIG. 3 can also be used to switch microcode routines during production of a die. Specifically, during initial stages of production, a given memory may be program with both microcodes. At a later stage, a default or alternative microcode may be "burned" into read-only memory and thus permanently utilized by the finished die. This embodiment is useful in scenarios where shared dies are used for multiple application purposes. Rather than "burn" microcode early in fabrication, this embodiment allows such burning to be done later in the production pipeline based on the end use of the die, thus avoiding waste of materials (in the event that a pre-programmed microcode is not desired).

The present disclosure has been described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used above may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a general-purpose processor, a special-purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

What is claimed is:

1. A method comprising:
receiving, at a memory device, a command;
accessing, by the memory device, a configuration parameter;
identifying, by the memory device, a program counter value based on the configuration parameter and the command, the program counter value associated with a first executable instruction of a microcode routine stored by the memory device for processing the command;
loading and executing, by the memory device, the microcode routine based on the program counter value;
storing multiple microcodes for the command, each of the multiple microcodes associated with a unique program counter value and
toggling of the multiple microcodes for the command based on the unique program counter values.

2. The method of claim 1, the command comprising a read or write command accessing a storage fabric managed by the memory device.

3. The method of claim 1, the configuration parameter comprising a trim parameter.

4. The method of claim 1, wherein the program counter value is determined based on a cycle count of the memory device.

5. The method of claim 4, the cycle count comprising a program/erase cycle count.

6. The method of claim 1, at least one of the multiple microcodes including a jump instruction, the jump instruction causing the memory device to load and execute a different microcode in the multiple microcodes.

7. The method of claim 6, the jump instruction further causing the memory device to execute the different microcode at a command other than a starting command of the different microcode.

8. A non-transitory computer readable storage medium for tangibly storing computer program instructions executed by a computer processor, the computer program instructions defining steps of:
receiving a command to access a memory device;
accessing a configuration parameter;
identifying a program counter value based on the configuration parameter and the command, the program counter value associated with a first executable instruction of a microcode routine stored by the memory device for processing the command;
loading and executing the microcode routine based on the program counter value;
storing multiple microcodes for the command, each of the multiple microcodes associated with a unique program counter value; and
toggling of the multiple microcodes for the command based on the unique program counter values.

9. The non-transitory computer readable storage medium of claim 8, the command comprising a read or write command accessing a storage fabric managed by the memory device.

10. The non-transitory computer readable storage medium of claim 8, the configuration parameter comprising a trim parameter.

11. The non-transitory computer readable storage medium of claim 8, wherein the program counter value is determined based on a cycle count of the memory device.

12. The non-transitory computer readable storage medium of claim 11, the cycle count comprising a program/erase cycle count.

13. The non-transitory computer readable storage medium of claim 8, at least one of the multiple microcodes including a jump instruction, the jump instruction causing the memory device to load and execute a different microcode in the multiple microcodes.

14. The non-transitory computer readable storage medium of claim 13, the jump instruction further causing the memory device to execute the different microcode at a command other than a starting command of the different microcode.

15. An apparatus comprising:
- a processor; and
- a storage medium for tangibly storing thereon program logic for execution by the processor, the program logic comprising instructions causing the processor to perform operations of:
  - receiving a command to access a memory device;
  - accessing a configuration parameter;
  - identifying a program counter value based on the configuration parameter and the command, the program counter value associated with a first executable instruction of a microcode routine stored by the memory device for processing the command;
  - loading and executing the microcode routine based on the program counter value;
- storing multiple microcodes for the command, each of the multiple microcodes associated with a unique program counter value and
- toggling of the multiple microcodes for the command based on the unique program counter values.

16. The apparatus of claim 15, the configuration parameter comprising a trim parameter.

17. The apparatus of claim 15, wherein the program counter value is determined based on a cycle count of the memory device.

* * * * *